(12) United States Patent
Sato et al.

(10) Patent No.: US 10,995,798 B2
(45) Date of Patent: May 4, 2021

(54) ROLLING BEARING

(71) Applicant: NSK LTD., Tokyo (JP)

(72) Inventors: Tsutomu Sato, Fujisawa (JP); Fangqi Gong, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/337,578

(22) PCT Filed: Jan. 29, 2018

(86) PCT No.: PCT/JP2018/002808
§ 371 (c)(1),
(2) Date: Mar. 28, 2019

(87) PCT Pub. No.: WO2018/143138
PCT Pub. Date: Aug. 9, 2018

(65) Prior Publication Data
US 2020/0032847 A1  Jan. 30, 2020

(30) Foreign Application Priority Data

Feb. 2, 2017 (JP) .............................. JP2017-017773

(51) Int. Cl.
*F16C 33/62* (2006.01)
*F16C 33/34* (2006.01)
*F16C 33/32* (2006.01)

(52) U.S. Cl.
CPC .............. *F16C 33/62* (2013.01); *F16C 33/34* (2013.01); *F16C 33/32* (2013.01);
(Continued)

(58) Field of Classification Search
CPC .. F16C 2204/04; F16C 2204/44; F16C 33/32; F16C 33/34; F16C 33/62; F16C 2223/30;
(Continued)

(56) References Cited

U.S. PATENT DOCUMENTS

| 3,420,755 A | * | 1/1969 | Paret ......................... B24C 1/00 |
| | | | 205/170 |
| 5,520,492 A | * | 5/1996 | Ohmi ....................... C25D 7/10 |
| | | | 411/427 |
| 2008/0240359 A1 | * | 10/2008 | Otsuka .................... F16C 33/32 |
| | | | 378/121 |

FOREIGN PATENT DOCUMENTS

JP  49-5586      1/1974
JP  58-42829 A   3/1983
(Continued)

OTHER PUBLICATIONS

"Lubrication", (1977), Study on Friction and Wear Performance of Ion-Plated Gold and Silver Films (Fifth edition), Twenty-third volume, Second issue, pp. 144 to 151.
(Continued)

*Primary Examiner* — Alan B Waits
(74) *Attorney, Agent, or Firm* — Sughrue Mion, PLLC

(57) ABSTRACT

A rolling bearing of the present invention includes an inner ring, an outer ring and a rolling element which are all made of a steel material, and (A) a surface of the rolling element is formed with an Ag coating film, and a raceway of at least one of the inner ring and the outer ring is formed with a Cr coating film or (B) a surface of the rolling element is formed with a Cr coating film, and a raceway of at least one of the inner ring and the outer ring is formed with a Cr coating film.

4 Claims, 2 Drawing Sheets

(52) U.S. Cl.
CPC ...... *F16C 2204/04* (2013.01); *F16C 2204/44* (2013.01); *F16C 2223/30* (2013.01); *F16C 2240/60* (2013.01)

(58) Field of Classification Search
CPC .............. F16C 2204/10; F16C 2204/52; F16C 2240/60; F16C 33/6696
See application file for complete search history.

(56) References Cited

FOREIGN PATENT DOCUMENTS

| JP | 58-113629 A | 7/1983 |
|---|---|---|
| JP | 59-92219 U | 6/1984 |
| JP | 63-4424 U | 1/1988 |
| JP | 5-32651 U | 4/1993 |
| JP | 5-32651 Y2 | 8/1993 |
| JP | 9-161698 A | 6/1997 |
| JP | 9-177774 A | 7/1997 |
| JP | 2001-254801 A | 9/2001 |
| JP | 2009-62575 A | 3/2009 |
| JP | 2014-22339 A | 2/2014 |

OTHER PUBLICATIONS

E. Rabinowicz, "The Determination of the Compatibility of Metals through Static Friction Tests", (1971), Trans. 14, 198, 8 pages. total.
Search Report dated Apr. 3, 2018, issued by the International Searching Authority in International Application No. PCT/JP2018/002808 (PCT/ISA/210).
Written Opinion dated Apr. 3, 2018, issued by the International Searching Authority in International Application No. PCT/JP2018/002808 (PCT/ISA/237).
Communication dated Sep. 25, 2018, issued by the Japanese Patent Office in counterpart Japanese Application No. 2018-533959.
Communication dated Nov. 13, 2018, issued by the Japanese Patent Office in counterpart Japanese Application No. 2018-533959.
Office Action dated Nov. 9, 2020 by the State Intellectual Property Office of P.R. China in counterpart Chinese Patent Application No. 201880009906.6.
Office Action dated Feb. 10, 2021 by the State Intellectual Property Office of P.R. China in counterpart Chinese Patent Application No. 201880009906.6.

* cited by examiner

ROLLING BEARING

TECHNICAL FIELD

The present invention relates to a rolling bearing, and more particularly, to a rolling bearing in which a surface of each of an inner ring, an outer ring and a rolling element, which are made of a steel material, is formed with a coating film for lubrication.

BACKGROUND ART

A rolling bearing for an X-ray tube bulb, for example, is used under high vacuum, high temperature and non-lubrication conditions and is required to have conductivity. Therefore, surfaces of raceways of an inner ring and an outer ring and a surface of a rolling element are conventionally formed with a solid lubrication coating film containing Pb as a main component. However, since Pb has high burden to the environment, it is demanded to use an environmentally-friendly alternate material.

As the alternate solid lubrication material, it is considered to use Ag in view of lubricity and conductivity. However, it is known that when Ag is used, Ag is attached (transferred to adhere) to a counter material not a little (Non-Patent Document 1). Also, since Ag is harder than Pb, noise and vibration may be caused even though small solid metal blanks is transferred.

As countermeasures against the transfer adhesion of Ag, Patent Document 1 discloses forming, as a counter material of Ag, a coating film of which solubility with Ag is low and discloses W and Ta as the coating film.

Also, Non-Patent Document 2 discloses mutual solubilities of various metal materials and discloses W and Ni as materials of which solubility with Ag is low.

PRIOR ART DOCUMENT

Patent Document

Patent Document 1: JP-U-H05-32651

Non-Patent Document

Non-Patent Document 1: Lubrication, Twenty-third volume, Second issue, pages 144 to 151 (1977), Study on Friction and Wear Performance of Ion-Plated Gold and Silver Films (Fifth edition)
Non-Patent Document 2: ASLE Trans. 14, 198 (1971), The Determination of the Compatibility of Materials through Static Friction Tests

SUMMARY OF INVENTION

Technical Problem

The investigations of the present inventors show that, in the case of the Ag coating film, the transfer adhesion cannot be prevented even though the counter material was coated with Ni. Also, W described in Patent Document 1 may not sufficiently prevent the transfer adhesion, so that there is room for improvement. That is, in the case of the rolling bearing that is used under vacuum, it cannot be said that it is always difficult for Ag to be transferred to adhere to a material, which has the low solubility with Ag.

Accordingly, the present invention has been made in view of the above situations. An object of the present invention is to provide a rolling bearing, in which a surface of a rolling element or raceways of an inner ring and an outer ring are formed with an Ag coating film for lubrication while suppressing Ag from being transferred to adhere to a counter material, so as to suppress deterioration of acoustic characteristics and prolong lifetime.

Solution to Problem

In order to solve the above problems, the present invention provides following rolling bearings.

(1) A rolling bearing includes an inner ring, an outer ring and a rolling element which are all made of a steel material,
a surface of the rolling element is formed with an Ag coating film, and
a raceway of at least one of the inner ring and the outer ring is formed with a Cr coating film.
(2) A rolling bearing includes an inner ring, an outer ring and a rolling element which are all made of a steel material,
a surface of the rolling element is formed with a Cr coating film, and
a raceway of at least one of the inner ring and the outer ring is formed with an Ag coating film.
(3) In the rolling bearing according to (1) or (2), an underlayer containing a Ni layer and a Cu layer in this order from a base material is interposed between the Ag coating film and the base material.
(4) In the rolling bearing according to any one of (1) to (3), a film thickness of the Ag coating film or a total film thickness of the Ag coating film and the underlayer is equal to or smaller than 1.0 μm.

Advantageous Effects of Invention

According to the present invention, in the rolling bearing in which the surface of the rolling element or the raceways of the inner ring and the outer ring are formed with the Ag coating film for lubrication, the Ag coating film can be suppressed from being transferred to adhere to a counter material, so as to improve acoustic characteristics and to prolong lifetime.

DESCRIPTION OF EMBODIMENTS

Figure 1:
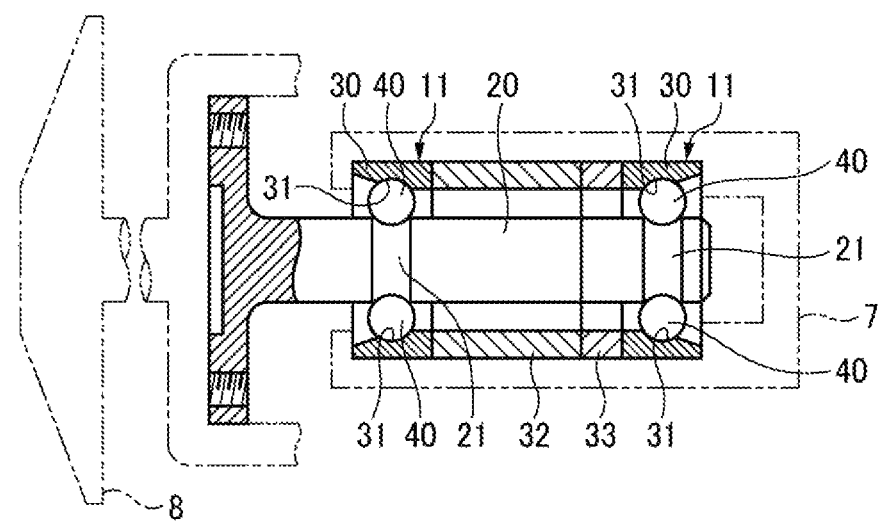
FIG. 1 is a sectional view illustrating an example of a bearing for an X-ray tube bulb.

Hereinafter, the present invention will be described with reference to the drawings.

In a rolling bearing of the present invention, a rolling element, an inner ring and an outer ring are all made of a steel material such as bearing steel, stainless steel, high speed steel and the like having excellent strength and fatigue lifetime. Specifically, SUS440C, SUJ2, SKH and the like may be exemplified. A surface of the rolling element or at least one of a raceway of the inner ring and a raceway of the outer ring, preferably both the raceways are formed with an Ag coating film for lubrication.

It is noted that a Cr coating film may be a coating film of Cr alone, a coating film of Cr alloy, CrN (chromium nitride) or the like. For example, CrN (chromium nitride) may be formed by a reactive sputtering or ion plating method.

The Cr coating film may be a multi-layered coating film. For example, the Cr coating film is obtained by forming films of Ni and Cr in this order from a base material (the rolling element or the inner and outer rings). The multi-layered coating film may be appropriately adjusted as long as the effects of the present invention are achieved.

In the case of the coating film of Cr alone, a content of Cr may be preferably 99.0 mass % or more, and more preferably 99.9 mass % or more of the coating film of Cr alone, and the balance may be inevitable impurities.

A content of CrN (chromium nitride) may be preferably 99.0 mass % or more, and more preferably 99.8 mass % or more of the coating film of CrN (chromium nitride), and the balance may be inevitable impurities.

In the case of Cr alloy, Ni, Co, Fe, Mo and the like may be exemplified as alloy components with Cr, and the alloy components may be two or more components. In this case, a content of Cr may be preferably 15 mass % or more, and more preferably 30 mass % or more of the coating film of Cr alloy, and the balance may be alloy components and inevitable impurities.

When the rolling element is formed with the Ag coating film, the raceway may be formed with the Cr coating film. Alternatively, when the raceways of the inner and outer rings are formed with the Ag coating film, the surface of the rolling element may be formed with the Cr coating film. With such combination of the coating films, Ag can be suppressed from being transferred to adhere to the counter material, and the initial smooth surfaces and the acoustic characteristics can be maintained for a long time.

In order to increase adhesiveness between the Ag coating film and the base material (the rolling element or the inner and outer rings), an underlayer may be preferably interposed. As the underlayer, a Ni layer and a Cu layer may be stacked in this order from the base material. As shown in Test 2 to be described later, the adhesiveness of the Ag coating film may not be sufficiently obtained only by the Ni layer.

As the method of forming the Ag coating film and the Cr coating film, methods which can uniformly form the coating film and easily control a film thickness may be preferably employed, and a sputtering method, an ion plating method and a plating method may be exemplified. It is noted that, when the Cr coating film is formed by the sputtering method, Cr may be bonded with oxygen upon exposure to the atmosphere. As a result, a stable state where the surface energy is low may be obtained, which contributes to the effect of suppressing the transfer adhesion.

If any of the Ag coating film, the Cr coating film and the underlayer is excessively thick, it may be likely to be peeled off, which may cause a problem in rotation of the bearing. On the other hand, if the coating film is excessively thin, the coating film may not be uniformly formed, so that a non-coated film portion may be generated. Particularly, since the Ag coating film has a role of lubrication of the bearing, it may be required to have an appropriate film thickness. Accordingly, the upper limit of a film thickness of the Ag coating film or a total film thickness of the Ag coating film and the underlayer may be preferably 1.0 µm or smaller, and more preferably 0.7 µm or smaller. The lower limit of the film thickness of the Ag coating film or the total film thickness of the Ag coating film and the underlayer may be preferably 0.2 µm or larger, and more preferably 0.4 µm or larger.

When stacking Ni and Cu as the underlayer, each film thickness may be preferably set, as follows.

The film thickness of Ni may be preferably 0.05 to 0.2 µm, and more preferably 0.05 to 0.15 µm.

The film thickness of Cu may be preferably 0.05 to 0.2 µm, and more preferably 0.05 to 0.15 µm.

The film thickness of Ag may be preferably 0.1 to 0.6 µm, and more preferably 0.2 to 0.5 µm.

Each content of Ni, Cu and Ag may be as follows.

The content of Ni may be preferably 99.0 mass % or more, and more preferably 99.9 mass % or more of the Ni coating film, and the balance may be inevitable impurities.

The content of Cu may be preferably 99.0 mass % or more, and more preferably 99.9 mass % or more of the Cu coating film, and the balance may be inevitable impurities.

The content of Ag may be preferably 99.0 mass % or more, and more preferably 99.9 mass % or more of the Ag coating film, and the balance may be inevitable impurities.

An additive and the like may be appropriately added to the Ag coating film. When the additive is added, the content of Ag may be preferably 90 mass % or more, and the balance may be the added additive and inevitable impurities.

The film thickness of the Cr coating film may be preferably 0.05 to 1.0 µm, and more preferably 0.05 to 0.15 µm.

It is noted that an extremely thin oxidation film may be formed on a surface of Ag in the atmosphere, so that the lubricity may be lowered due to the oxidation film. In order to solve the oxidation problem, an oxidation resistant coating film of soft metal may be formed on the surface of the Ag film. As the soft metal, Ti, In, Sn, Mg, Zn, Al and the like having favorable adhesiveness with Ag and higher ionization tendency than Ag may be preferable, so that the favorable oxidation resistant effect may be achieved. In particular, In and Sn may be preferable because the lubricity is also expected.

As a method of forming the oxidation resistant coating film, the sputtering, the plating and the like may be exemplified. However, if the oxidation resistant coating film is excessively thick, it may cause the vibrations. Therefore, the film thickness may be preferably set to 100 nm or smaller, and it may be necessary to adjust the film thickness. If the thickness is 100 nm or smaller, the oxidation resistant coating film may be rapidly peeled off during use, so that the lubrication by Ag having excellent lubricity may be achieved. Since Ag is likely to be oxidized, reduction processing may be preferably implemented before the formation of the oxidation resistant coating film.

In the present invention, since the Ag coating film functions as the solid lubrication coating film, the lubricity can be provided even in the utility where lubricating oil and grease cannot be used. Both the Ag coating film and the Cr coating film have excellent conductivity. Accordingly, the rolling bearing of the present invention may be favorably used for the bearing for an X-ray tube bulb that is used under high vacuum and high temperatures and is required to have conductivity.

The bearing for an X-ray tube is not particularly limited, and an example thereof is shown in FIG. 1. As shown, a pair of full type ball bearings 11, 11 are rotatably supported to a rotary shaft 20. Outer rings 30, 30 are fitted to a housing 7 by clearance fitting and are arranged to be axially moveable relative to the housing 7. Both the ball bearings 11, 11 are so-called "integral type deep groove ball bearings" where a plurality of balls 40, 40 are interposed between outer ring raceways 31, 31 and inner ring raceways 21, 21 directly formed on the rotary shaft 20. The balls 40, 40 are respectively formed with the Ag coating film, and the outer ring raceways 31, 31 and the inner ring raceway 21, 21 are respectively formed with the Cr coating film. Alternatively, the balls 40, 40 may be respectively formed with the Cr coating film, and the outer ring raceways 31, 31 and the inner ring raceways 21, 21 may be respectively formed with the Ag coating film. The Ag coating film may be formed via the underlayer containing the Ni layer and the Cu layer. A reference numeral 8 indicates a target plate.

An outer peripheral surface of the rotary shaft 20 including the inner ring raceways 21, 21 and an inner peripheral surface including the outer ring raceways 31, 31 may be respectively formed with a heat transfer promoting film. When inner peripheral surfaces of collars 32, 33 are also formed with a heat transfer promoting film, the heat transfer efficiency may be further improved.

The type of the bearing is not particularly limited. Although the integral type deep grove ball bearing is shown in FIG. 1, the rotary shaft and the inner ring may be separately configured. In addition, the present invention can be also applied to an angular ball bearing, a roller bearing and the like.

From the above, the present invention may be more preferably configured, as follows.
Regarding the Bearing Type The present invention may be preferably applied to the ball bearing such as an integral type deep grove ball bearing, a deep groove ball bearing, an angular ball bearing and the like.
Regarding the Materials The material of the ball may be preferably SUS440C, SUJ2 or SKH4. The materials of the outer ring and the inner ring may be preferably SUS440C, SUJ2 or SKH4. Regarding the components of the steel materials, SUS440C conforms to JIS G 4303 (2012), SUJ2 conforms to JIS G 4805 (2008), and SKH4 conforms to JIS G 4403 (2015).
Regarding the Coating Film of the Ball It may be preferable to form Ni plating 0.05 to 0.15 µm, Cu plating 0.05 to 0.15 µm, and Ag plating 0.2 to 0.5 µm in this order from the base material by the electroplating method. A total thickness of the Ni plating, the Cu plating and the Ag plating may be preferably 0.4 to 0.7 µm. Also, preferably, the content of Ni in the Ni plating may be 99.9 mass % or more, the content of Cu in the Cu plating may be 99.9 mass % or more, and the content of Ag in the Ag plating may be 99.9 mass % or more, and the balances are all inevitable impurities.
Coating Film of the Outer Ring The coating film 0.05 to 0.15 µm of Cr may be preferably formed by the sputtering method. The content of Cr in the Cr coating film may be preferably 99.9 mass % or more, and the balance may be inevitable impurities.
Coating Film of the Inner Ring The coating film 0.05 to 0.15 µm of Cr may be preferably formed by the sputtering method. The content of Cr in the Cr coating film may be preferably 99.9 mass % or more, and the balance is inevitable impurities.

Examples

In the below, the present invention is further described with reference to Examples. However, the present invention is not limited thereto.
(Test 1)

A full type ball angular bearing of a product number 7200A including an inner ring, an outer ring and balls (rolling elements) was prepared (an inner diameter 10 mm, an outer diameter 30 mm, a width 9 mm, a contact angle α=30°, the number of balls: 12, a diameter of the ball: ³⁄₁₆ inch). The inner ring and the outer ring were made of SUJ2, and the balls were made of SUS440C or SUJ2. The surfaces of the four balls, which were aligned with equal intervals, of the 12 balls were formed with the Ag coating film, and the other eight balls were formed with no coating film. By the electroplating method, the underlayer was formed in order of the Ni layer and the Cu layer from the base material, and the Ag coating film was formed thereon. The film thickness of the Ni coating film was 0.1 µm, the film thickness of the Cu coating film was 0.1 µm, and the film thickness of the Ag coating film was 0.3 µm. The respective raceways of the inner ring and the outer ring were formed with the metal coating film shown in Table 1 by the sputtering method or the electroplating method. Then, an angular ball bearing was assembled using the balls and the inner and outer rings and was used as a test bearing.

Figure 2:
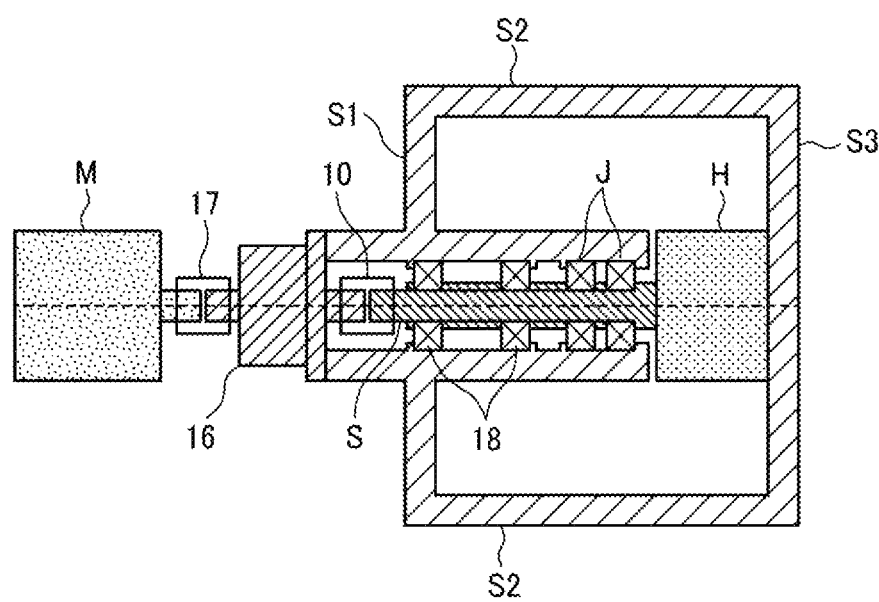
FIG. 2 is a sectional view illustrating a high-temperature rotary tester under vacuum used in Tests 1 to 3.

The test bearing was mounted to a high-temperature rotary tester under vacuum shown in FIG. 2, and a rotating test was performed.

The tester includes a rotary shaft S supported by the test bearing J, a motor M configured to rotate the rotary shaft S, a heater H configured to heat the rotary shaft S, a flange S1 and walls S1, S2 forming a vacuum chamber, and a thermocouple (not shown) configured to detect a temperature of the test bearing J. The rotary shaft S is supported by a bearing 18 in addition to the test bearing J.

An end portion of the rotary shaft S facing the motor M is connected to one end of a rotary shaft of a magnetic seal unit 16 by a coupling 10, and the other end of the rotary shaft of the magnetic seal unit 16 is connected to the motor M by a coupling 17. The magnetic seal unit 16, the coupling 17 and the motor M are accommodated in a housing (not shown), which is installed under atmosphere.

The test bearing J was rotated with conditions of axial load: 30N, rotating speed: 4,500 min$^{-1}$, temperature: 25° C., and a degree of vacuum: 3×10$^{-3}$ Pa, and a vibration value was measured by an acceleration pickup equipped on a surface of the flange S1 of the vacuum chamber. The time until the vibration value exceeded five times (25 m/s$^2$) of the initial vibration value was measured shown as "time until vibration increase" in Table 1.

TABLE 1

| | Coating films of inner ring and outer ring | | | |
|---|---|---|---|---|
| | Material of coating film | Manufacturing method of coating film | Film thickness of coating film | Time until vibration increase |
| Example 1 | Cr | sputtering | 0.12 µm | 1105.0 min |
| Comparative Example 1 | No film | — | — | 298.5 min |
| Comparative Example 2 | Ni | electroplating | 0.10 µm | 10.5 min |
| Comparative Example 3 | Ti | sputtering | 0.05 µm | 455.0 min |
| Comparative Example 4 | Cu | electroplating | 0.10 µm | 48.5 min |
| Comparative Example 5 | W | sputtering | 0.10 µm | 103.5 min |

As shown in Example 1, one component was formed with the Ag coating film and the counter material was formed with the Cr coating film, so that the transfer adhesion of Ag did not occur, so that the vibration did not increase and the lifetime was considerably prolonged, as compared to Comparative Examples where the other metals were used. In particular, Comparative Example 5 is a combination of Ag and W disclosed in Patent Document 1. However, the lifetime was about one-tenth, as compared to the combination of Ag and Cr in Example 1.

(Test 2)

The same full type ball angular bearing as Test 1 was used, and all of the 12 balls were formed with the Ag coating film. At this time, as shown in Table 2, in the coating film 1, only the Ni layer was formed as the underlayer, and in the coating film 2, the two layers of the Ni layer and the Cu layer were formed in this order from the base material and the Ag coating film was formed thereon. The Ag coating film and the underlayer were all formed by the electroplating method, and the film thickness of the Ag coating film was 0.6 μm. The respective raceways of the inner ring and the outer ring were formed with the Cr coating film of 0.12 μm by the sputtering method.

Then, the test bearings were manufactured, the vibration values were measured with the same conditions by using the high-temperature rotary tester under vacuum shown in FIG. 2, and the lifetimes were obtained. For the coating film 1, the test was performed using the four manufactured test bearings, and for the coating film 2, the test was performed using the five manufactured test bearings. In the meantime, when there was no vibration increase at a time of 1333.0 min from the rotation start, the test was stopped. The results are shown in Table 2.

TABLE 2

| | Ni coating film | Cu coating film | Ag coating film | Testing time | Remarks |
|---|---|---|---|---|---|
| Coating film 1 | 0.1 μm | — | 0.6 μm | 1333.0 min | Stopped |
| | | | | 538.2 min | Vibration increase |
| | | | | 45.6 min | Vibration increase |
| | | | | 560.2 min | Vibration increase |
| Coating film 2 | 0.1 μm | 0.1 μm | 0.6 μm | 1333.0 min | Stopped |
| | | | | 1333.0 min | Stopped |
| | | | | 1333.0 min | Stopped |
| | | | | 1333.0 min | Stopped |
| | | | | 1333.0 min | Stopped |

In the coating film 1 where only the Ni layer was used as the underlayer, the vibration increase did not occur until the test stop, in one test bearing. However, in the other three test bearings, the vibration increase occurred in a short time and there was a large deviation of lifetime. In contrast, in the coating film 2 where the two layers of the Ni layer and the Cu layer were used as the underlayer, the vibration increase did not occur until the test stop, in all the test bearings, and the lifetime prolonging was stably facilitated. The reason is that the Cu layer was interposed between the Ag coating film and the Ni layer and the adhesiveness of the Ag coating film was thus further improved.

(Test 3)

The same full type ball angular bearing as Test 1 was used, and all of the 12 balls were formed with the Ag coating film. At this time, as shown in Table 3, the film thickness of each of the Ag coating film and the underlayer was changed and any coating film was formed by the electroplating method. In the meantime, the two layers of the Ni layer and the Cu layer were formed in this order from the base material, as the underlayer. In the meantime, the respective raceways of the inner ring and the outer ring were formed with the Cr coating film of 0.12 μm by the sputtering method.

Then, the test bearings were manufactured, the vibration values were measured with the same conditions by using the high-temperature rotary tester under vacuum shown in FIG. 2, and the lifetimes were obtained. Although the number of the test bearings was different for each coating film, the average lifetime is shown in Table 3. Also, FIG. 3 is a graph illustrating a relation between a total film thickness of the Ag coating film and the underlayer and the average lifetime.

TABLE 3

| | Film thickness of underlayer | Ag coating film | Total film thickness | Average lifetime |
|---|---|---|---|---|
| Coating film 3 | 0.35 μm | 0.99 μm | 1.34 μm | 436.3 min |
| Coating film 4 | 0.75 μm | 0.78 μm | 1.53 μm | 149.4 min |
| Coating film 5 | 1.07 μm | 0.54 μm | 1.61 μm | 97.1 min |
| Coating film 6 | 1.73 μm | 0.71 μm | 2.44 μm | 45.3 min |
| Coating film 7 | 0.16 μm | 0.12 μm | 0.28 μm | 1147.6 min |
| Coating film 8 | 0.12 μm | 0.53 μm | 0.65 μm | 1333.0 min |
| Coating film 9 | 0.12 μm | 0.85 μm | 0.97 μm | 1333.0 min |
| Coating film 10 | 0.37 μm | 0.73 μm | 1.10 μm | 386.6 min |
| Coating film 11 | 0.27 μm | 0.66 μm | 0.93 μm | 952.4 min |

Figure 3:
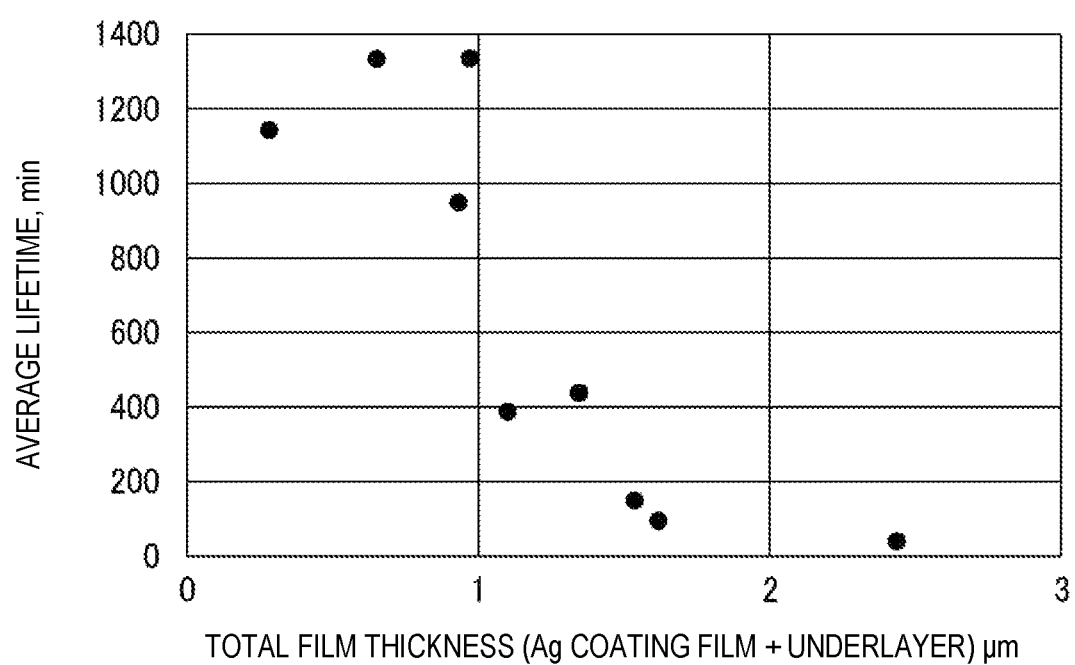
FIG. 3 is a graph illustrating a result of Test 3.

As shown in Table 3 and FIG. 3, when the total film thickness exceeded 1.0 μm, the lifetime was extremely shortened. The reason is that when the coating film is excessively thick, the unevenness is generated upon contact of the balls and thus the vibration increase occurs.

Although the present invention has been described in detail with reference to the specific embodiment, it is appreciated to one skilled in the art that various changes and modifications can be made without departing from the spirit and scope of the present invention.

The present application is based on Japanese Patent Application No. 2017-17773 filed on Feb. 2, 2017, the contents of which are incorporated herein by reference.

INDUSTRIAL APPLICABILITY

According to the present invention, it is possible to improve the acoustic characteristics and to prolong the lifetime in the rolling bearing that is used under high vacuum, high temperature and non-lubrication conditions and is required to have conductivity.

REFERENCE SIGNS LIST

7: housing
8: target plate
11: full type ball bearing
20: rotary shaft
21: inner ring raceway
30: outer ring
31: outer ring raceway
40: ball

The invention claimed is:

1. A rolling bearing comprising:
an inner ring, an outer ring and a rolling element which are all made of a steel material,
wherein a surface of the rolling element is formed with an Ag coating film as an outermost layer, and
wherein a raceway of at least one of the inner ring and the outer ring is formed with, as an outermost layer, a coating film which is any one selected from a coating film of Cr alone, a coating film of Cr alloy, a multi-layered coating film containing a layer of Cr alone as the outermost layer, or a multi-layered coating film containing a layer of Cr alloy as the outermost layer,
wherein an underlayer containing a Ni layer and a Cu layer in this order from a base material is interposed between the Ag coating film and the base material, and
wherein a film thickness of a total film thickness of the Ag coating film and the underlayer is equal to or smaller than 1.0 μm and equal to or larger than 0.4 μm.

2. The rolling bearing according to claim 1, wherein the film thickness of the total film thickness of the Ag coating film and the underlayer is equal to or smaller than 0.7 μm.

3. A rolling bearing comprising:
an inner ring, an outer ring and a rolling element which all made of a steel material,
wherein a surface of the rolling element is formed with, as an outermost layer, a coating film which is any one selected from a coating film of Cr alone, a coating film of Cr alloy, a multi-layered coating film containing a layer of Cr alone as the outermost layer, or a multi-layered coating film containing a layer of Cr alloy as the outermost layer, and
wherein a raceway of at least one of the inner ring and the outer ring is formed with an Ag coating film as an outermost layer,
wherein an underlayer containing a Ni layer and a Cu layer in this order from a base material is interposed between the Ag coating film and the base material, and
wherein a film thickness of a total film thickness of the Ag coating film and the underlayer is equal to or smaller than 1.0 μm and equal to or larger than 0.4 μm.

4. The rolling bearing according to claim 3, wherein the film thickness of the total film thickness of the Ag coating film and the underlayer is equal to or smaller than 0.7 μm.

* * * * *